April 26, 1938.   F. WEINBERG   2,115,092
WHEEL STRUCTURE
Filed Jan. 17, 1934
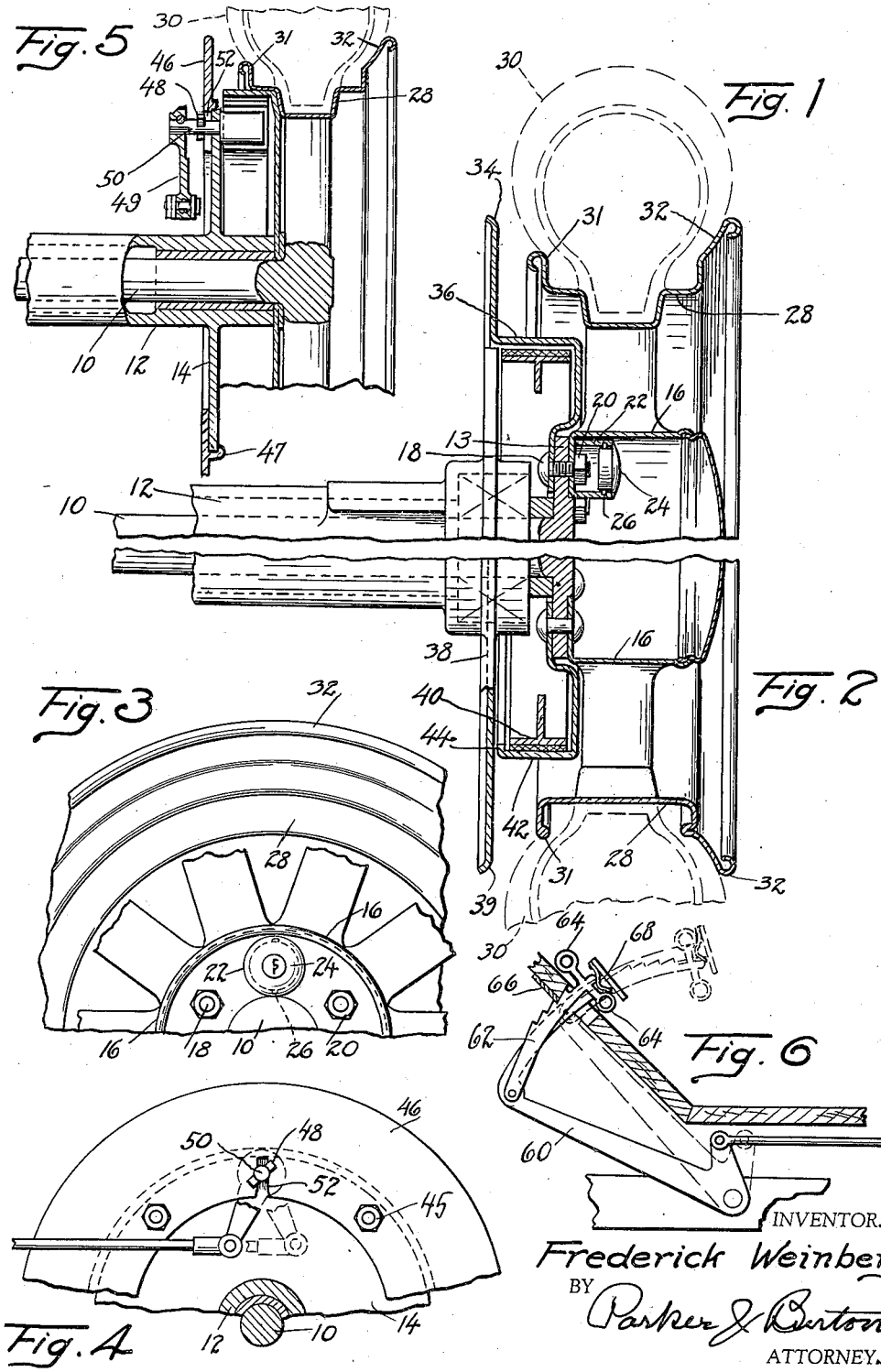
INVENTOR.
Frederick Weinberg
BY Parker & Burton
ATTORNEYS.

Patented Apr. 26, 1938

2,115,092

UNITED STATES PATENT OFFICE 2,115,092

WHEEL STRUCTURE

Frederick Weinberg, Detroit, Mich.

Application January 17, 1934, Serial No. 706,904

8 Claims. (Cl. 301—5)

My invention relates to improvements in vehicle wheel structures and particularly to a wheel provided with a tire and so constructed and related to its environment as to prevent theft of the tire.

My invention relates particularly to the provision of inexpensive, simple means to prevent tire theft from the road wheels of a vehicle as distinguished from theft of a spare tire although it is applicable to the latter. At the present time tires may easily be removed from the road wheel by jacking up the wheel and removing the tire from the rim notwithstanding such wheel may be locked to the vehicle. It is an object of my invention to provide a vehicle wheel structure which either by itself or coacting with neighboring elements will prevent the unauthorized removal of the tire therefrom.

More specifically, an object of the invention is to provide a tire carrying rim so formed and so related to other wheel or car structures that the tire may be readily removed inwardly but not outwardly from the rim. Devices are now in use which prevent unauthorized removal of the wheels. This is accomplished through various types of locking devices which are employed to lock the wheels on the vehicle, which operation however will not secure the tires against theft from the wheels. My invention is adaptable for use in conjunction with these locked wheels and when so used provides means whereby the locking of the wheels secures at the same time the tires against removal. It is only upon unlocking either the wheel or the obstruction adjacent thereto and removing either that the tire can be removed.

My invention is adapted to wheels which are locked against removal collectively by a mechanism from some place inside the vehicle as well as to wheels which are so locked individually. It is also adaptable to wheels which are non-detachable. The invention may be practiced in connection with clincher or straight side tires and with the ordinary rim or the drop center rim. Because of such manifold uses my invention may take on different forms. Broadly speaking, it consists in mounting the tire within a wheel environment between two obstructing elements adapted, while disposed in a determined relationship, to prevent removal of the tire. One of said elements may be shifted axially of the wheel with respect to the other element, to permit removal of the deflated tire from the rim.

An important characteristic is that I provide, as one element of the wheel structure, a rim which supports the tire, which rim is not removable from the wheel and is provided with a non-removable outer portion that projects radially outwardly with respect to the adjacent side wall of the tire and is of such a diameter as to prevent direct removal of the tire outwardly thereover; that is in an axial direction away from the center of the car. This portion constitutes one of said retaining elements. The opposite side wall of the rim is adapted to retain the tire in place but it is of such a character that the tire may be withdrawn inwardly thereover; that is in an axial direction toward the car center. The wheel structure is such, however, that removal of the tire over the inside of the rim is not feasible while said two obstructing elements maintain their normal position.

In many automobiles certain parts of the frame, body or running gear of the vehicle prevent such removal of the tire from the rim inwardly and its subsequent withdrawal over the wheel outwardly. On those vehicles which are not already provided with such obstructing parts I propose to provide a retaining element which is so built as to prevent removal of the tire from the rim inwardly with its subsequent withdrawal over the wheel outwardly.

Another important feature of my invention is the provision in wheel mechanism of a tire removal obstructing element which projects radially with respect to the inner side wall of the tire in such proximity thereto as to prevent removal of the tire from the rim while the wheel maintains its normal position.

Specifically, various arrangements may be provided to carry out the purpose of my invention of preventing tire theft. In each construction removal of the tire directly outwardly from the rim is prevented by an obstructing element which forms an integral part of the wheel assembly. A cooperating obstructing element is arranged inwardly of the tire which also prevents unauthorized removal of the tire inwardly from the rim. This inner obstructing element may be carried by the brake drum, the brake backing plate or some other suitable support therefor. So long as said elements retain a determined spaced relationship removal of the tire is prevented. Authorized axial movement of one of said elements with respect to the other is permitted. This movement may occur in various ways as is hereinafter set forth. As a result of this movement removal of the tire is permitted.

Other advantages and meritorious features of my invention will more fully appear from the following description, appended claims, and accompanying drawing, wherein:

Figure 1 is a vertical sectional view through a portion of a wheel embodying my invention, Figure 2 is a vertical sectional view through a portion of a wheel embodying a modification of my invention, Figure 3 is a side elevation of a fragment of a wheel with the hub cap removed, Figure 4 is a side elevation of a fragment of the inner side of a wheel embodying a modification of my invention, Figure 5 is a vertical sectional view through a wheel shown in Figure 4, and Figure 6 is a fragmentary view showing the brake pedal provided with locking means.

The invention is particularly intended for employment in connection with all four wheels of motor vehicles although I have exemplified it here on one driving wheel only. In Figure 1 of the drawing let 10 indicate the live axle and 12 the axle housing. The axle 10 is provided with a flange portion 13 at its end to which a wheel having a hub 16 is secured by bolts 18 provided with nuts 20. One or more of these bolts is shown as provided with a locking device which prevents removal of the wheel without releasing the locking device.

Various types of locking devices are now in use to accomplish this result. My invention is well adapted for use in conjunction with a wheel which is so fitted in order that the combined result may be the complete protection of the wheel and the tire. The particular locking device shown comprises a cup shaped portion 22 which, as shown, is an integral part of the housing but may be held on the stud bolt 18 by the nut 20 and which is of such a size as to permit the entrance of a wrench thereinto to release the nut. The cup 22 is sealed with a locking member 24 which is received therein and which through a key control lock mechanism is adapted to be locked within the cup 22. Locks of this kind are well known. There are key controlled fingers 26 which are projected outwardly into recesses in the cup to secure the member 24 in place.

The wheel includes a rim 28 and this rim carries the tire 30. The tire shown is of the conventional pneumatic variety. The rim here shown is of the well known straight side drop center type but may be of the clincher type as shown in Figure 2. In the ordinary drop center rim, upon deflation of the tire, the tire casing on one side of the wheel may be moved into the drop center portion in order that the portion of the casing diametrically opposed may be withdrawn over the side flange of the rim to remove the tire. In the employment of the phrase "drop center" I intend to include a rim having a circumferential recess capable of fulfilling this purpose even though the recess might not be located in the center of the rim but to one side thereof as has been also heretofore suggested. Rims of this kind as now used are provided with side flanges and in Figure 1, I have shown an inner side flange 31 which corresponds with the type of side flanges now found on such rims and over which the tire may be withdrawn as above described or forced by stretching as in the clincher type shown in Figure 2.

A feature of my invention, however, is that I provide on the outside of the rim a non-removable flange 32 which projects radially over the side wall of the tire to a substantially greater distance than does the flange 31. This outer flange is of such a diameter that it is not possible by deflation of the inner tube to withdraw the tire directly outwardly over the flange 32. The tire can only be withdrawn directly inwardly over the inner flange 31.

In some vehicles the frame structure or some other part of the vehicle has obstructing parts adjacent and in such proximity to the wheel and constituting a part of the wheel environment which prevent removal of the tire inwardly from the rim, with its consequent outward removal over the wheel, so long as the wheel maintains its normal position on the vehicle. Where such is not the case as in Figures 1, 2, and 5, I have provided specific obstructing elements which prevent unauthorized removal of the tire inwardly directly from the rim. So long as this inner obstructing element and the outer obstructing element maintain their normal relationship in the wheel environment removal of the tire from the rim is prevented. It is only after one of these obstructing elements has been moved with respect to its cooperating element that such removal can be accomplished.

In Figure 1, such inner obstructing element is a flange or a part 34 formed on the brake drum 36, which flange extends radially to such a distance that the tire cannot be withdrawn thereover, and which is located in such proximity to the wheel that removal of the tire over the flange 31 of the rim is likewise prevented so long as the wheel maintains its normal position.

To remove the tire it is first necessary to remove the wheel. Removal of the wheel can only be accomplished through releasing and removing the lock element 24 with the consequent removal of the nut 20 protected by the lock. Upon removal of the wheel the tire can be removed from the rim by withdrawal over the inner flange 31.

The invention may, however, be practiced equally well on a nondemountable wheel with a keyless lock as shown in Figure 2. In the embodiment of my invention shown in this figure the four wheels and the tires thereon are locked simultaneously against unauthorized removal by setting the brakes in the "on" position. The brake band, brake shoes or other non-rotating brake friction mechanism 40 prevents, when expanded by setting of the brakes in the "on" position, axial withdrawal of the wheel. The brake drum 42 is turned inwardly radially along its inner edge forming a shoulder or flange 44. When the brake friction means 40 is expanded, upon application of the brakes, this flange 44 overhangs the same preventing withdrawal of the drum and wheel axially. When the band 40 is contracted, upon release of the brakes, the brake drum and wheel may be freely withdrawn axially. It is understood that the brake band or the like is mounted upon the backing plate 38 in a manner well known. In this exemplification of my invention the backing plate 38 is provided with a radially extending portion 39 which corresponds, in its function of preventing removal of the tire inwardly from the rim, to the radially extending flange 34 on the drum of Figure 1. In Figure 2 the rim and tire assembly is of the clincher type.

Figure 6 exemplifies a brake pedal possessing means to hold the brakes in an "on" position to carry out the locking of the wheels and tires. Fulcrumed to foot pedal 60 is ratchet lever 62 having a projecting button 64 to kick the lever in and out of operation. When kicked in the ratchet engages retaining plate 66 holding itself and the pedal in the "on" position, but when kicked out as shown in dotted lines, the pedal is free to obey the pressure of the foot. A spring 68 attached to the pedal holds the ratchet either in or out of the operative position.

The brakes need not be set tight to accomplish the purpose intended and the car may be moved at will as mandatory in some localities. This type of structure would cooperate with the construction of Figure 2 to prevent removal of the tire, by preventing removal of the wheels when the brakes were "on" as described herein.

It will be understood that though I have shown the invention as applied only to one wheel it is to be correspondingly applied to all four wheels of the vehicles and the brake hook up from the pedal to the expansible brake friction means as required for the functioning of the structures of Figures 2, 4 and 5 may be of a conventional character.

Figure 5 shows my invention exemplified on a nonremovable wheel. In this type the specific inner obstructing element has taken on the form of the annular extension 46 seated on and attached to the backing plate and locked to the latter by the key 48 only when the brakes are "on", but removable therefrom when they are released. The key 48 is formed on an extension of the brake cam shaft 50, which may be conventionally mounted. When the brake is "on", or applied, the key 48 is positioned out of registry with slot 52 in the annular obstructing element 46.

When the brakes are released key 48 will be positioned parallel to the slot 52 in the annular extension 46 which extension may be then withdrawn thereover. The obstructing extension 46 has a lug 47, diametrically opposite the slot 52, which lug is adapted to engage over the backing plate as shown in Figure 5. Upon withdrawal of the extension 46 over key 48 extension 46 may be dropped down sufficiently to release the lug 47. This lower portion of the part 46 may then be moved inwardly. Upon clearing of the backing plate by the lug 47 and removal of the nuts 45 the part 46 may be lifted to be moved inwardly sufficiently to permit removal of the tire inwardly from the rim. The slot 52 is larger than key 48. After the inward shifting of the annular obstructing element 46 the tire may be removed from the rim inwardly over the rim edge 31 and thereafter outwardly over the rim edge 32 and over the wheel itself, while a remounting of the tire may be had by a reversal of these operations.

From the foregoing description will be seen that the particularly described non-symmetrical section of the wheel rim and its coaction with an obstructing element is common to the various forms shown, also that the specific obstructing element may take on various forms, according to each specific use the invention is put to, without change in function and still embody the invention. Throughout the specification and claims where I have referred to the tire obstructing element as preventing removal of the tire from the wheel or rim, I mean removal of the tire directly from the rim thereover. Obviously after the tire is removed inwardly from the wheel or partially therefrom it may be removed over the outer tire obstructing element.

Where the setting of the brakes cannot be accomplished, as while the car is unattended, the locking of the wheels and tire may be accomplished, while the brakes are in the "off" position. In this case key 48 may be set to register with slot 52 in the "on" position of the brakes. In this structure the ratchet arrangement shown in Fig. 6 may be omitted.

What I claim is:

1. A wheel structure comprising, in combination, a wheel supporting element, a wheel thereon, a tire on the wheel, said wheel having a part projecting radially with respect to the tire to such a diameter as to prevent withdrawal of the tire from the wheel outwardly, said wheel formed to permit removal of the tire therefrom inwardly, and removable means positioned adjacent the inner side of the wheel adapted to obstruct removal of the tire from the wheel inwardly.

2. A vehicle structure comprising a wheel having a tire removable from the wheel on one side, an obstructing element associated with that side of the wheel adapted to prevent removal of the tire from the wheel on such side, means controlled by the brake mechanism removably locking the obstructing element in said tire obstructing position.

3. A vehicle structure comprising a wheel having brake mechanism and a removable tire, a fixed obstructing element on one side of the wheel preventing removal of the tire from the wheel over said side, a tire obstructing element separably associated with the opposite side of the wheel and means controlled by the brake mechanism operably to lock said separable tire obstructing element and wheel against separable movement.

4. A vehicle structure comprising a wheel having a tire removable from the wheel on one side, brake mechanism including a brake backing plate associated with the wheel on said side, removable means associated with the backing plate adapted to obstruct unauthorized removal of the tire from the wheel on such side.

5. A vehicle wheel having a tire removable from the wheel on one side, brake mechanism including a brake backing plate associated with the wheel on said side, said tire being irremovable from the wheel on the opposite side, means separably associated with the backing plate operable to obstruct removal of the tire from the wheel on said side, and mechanism controlled by the brake controlling the separation of said tire obstructing means and backing plate.

6. In mechanism of the class described, a vehicle wheel, brake mechanism therefor, a tire on the wheel, said wheel constructed to permit removal of the tire therefrom on one side, an obstructing element separably associated with the wheel on such side adapted to obstruct removal of the tire therefrom, and means cooperating with the brake mechanism to prevent separation of the wheel and said obstructing element.

7. In mechanism of the class described, a vehicle wheel, brake mechanism therefor, a tire on the wheel, said wheel constructed to permit direct removal of the tire therefrom on one side only, an obstructing element associated with the wheel on such side adapted to normally obstruct removal of the tire therefrom, said wheel and obstructing element being separable to permit removal of the tire from the wheel on such side, said brake mechanism having a position of brake release and a position of brake application, means cooperating with the brake mechanism in one of said positions to prevent separation of the wheel and said obstructing element and adapted in the other of said positions to permit said separation.

8. In mechanism of the class described, a removable vehicle wheel, brake mechanism therefor, a tire on the wheel, said wheel constructed to permit removal of the tire therefrom upon one side, an obstructing element separably associated with the wheel on such side and adapted normally to obstruct removal of the tire therefrom, means cooperating with the brake mechanism operable to lock the wheel against removal and to lock said wheel and obstructing element against separation.

FREDERICK WEINBERG.